United States Patent [19]

McIntyre

[11] Patent Number: 4,565,217

[45] Date of Patent: Jan. 21, 1986

[54] THREE-WAY POPPET VALVE, METHOD AND APPARATUS

[75] Inventor: Frederic S. McIntyre, Wellesley, Mass.

[73] Assignee: Acumeter Laboratories, Inc., Marlborough, Mass.

[21] Appl. No.: 509,354

[22] Filed: Jun. 30, 1983

[51] Int. Cl.[4] ............................................. B29B 5/00
[52] U.S. Cl. .................................. 137/625.5; 137/563
[58] Field of Search ................ 137/625.5, 563; 251/63

[56] References Cited

U.S. PATENT DOCUMENTS

| | | | |
|---|---|---|---|
| 2,209,709 | 7/1940 | Weatherhead | 137/625.5 X |
| 3,260,504 | 7/1966 | Mojonnier | 137/625.5 X |
| 3,924,651 | 12/1975 | Hippel | 137/625.5 X |
| 4,378,335 | 3/1983 | Boden | 137/563 X |

OTHER PUBLICATIONS

"Extruder Valve", 1977 Bulletin of Acumeter Laboratories.
"Wide Band Extrusion Nozzles", 1982 Bulletin of Acumeter Laboratories.

Primary Examiner—Alan Cohan
Attorney, Agent, or Firm—Rines & Rines, Shapiro & Shapiro

[57] ABSTRACT

A three-way poppet valve for directing the flow of a fluid that will permit precise, constant thickness patterns of fluid coating upon a moving surface and cause a minimum of after-drool when the coating process is ceased. The three-way poppet valve assembly is also provided with means to rapidly change the direction of fluid flow to create rapid on/off fluid deposition cycle times and facilitate the formation of minimum length coatings on a rapidly moving surface.

6 Claims, 1 Drawing Figure

U.S. Patent  Jan. 21, 1986  4,565,217
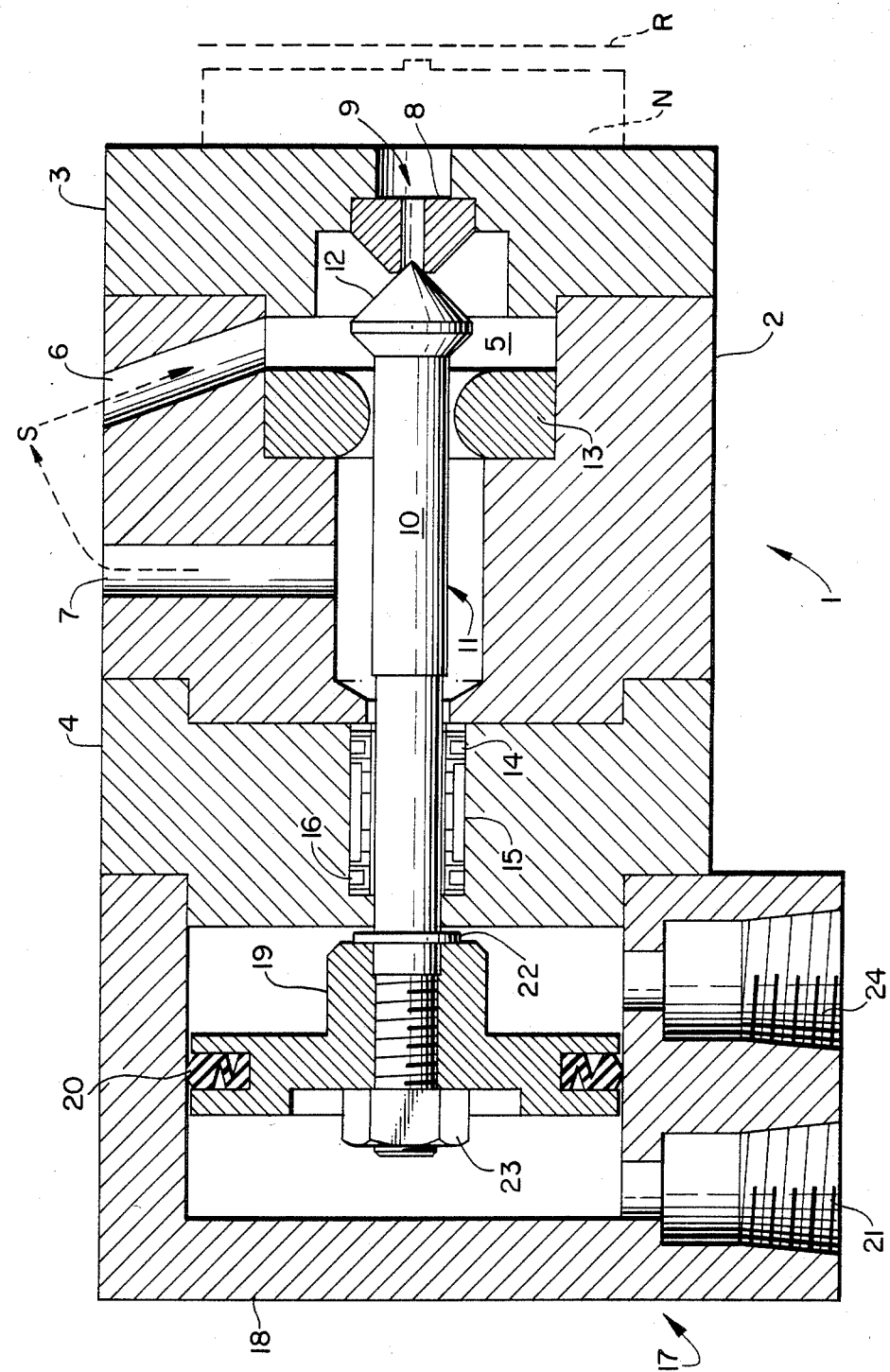

THREE-WAY POPPET VALVE, METHOD AND APPARATUS

BACKGROUND OF THE INVENTION

1. Field of the Invention

The present invention relates to a method and apparatus for valving the flow of fluid in a fluid applicator or coating systems and the like. More specifically, the invention is in one important application concerned with mechanical or electromechanical valving devices for controlling the depositing from nozzles upon moving surfaces of predetermined amounts of adhesive or other coating fluids.

2. Description of the Prior Art

In the art of fluid deposition on moving surfaces it is well known to use a two-way poppet valve with a single fluid supply input to the valve assembly. One such is described, for example, in the "Extruder Valve" 1977 bulletin of Acumeter Laboratories, the assignee of the present invention. A pressure relief valve, located at the source fluid pump, relieves any excess pressure when the two-way poppet valve is closed. Upon opening the poppet valve to apply fluid to the moving surface, the internal pressure discharges, causing a sudden surge with subsequent dropoff of pressure and fluid displacement. This effect in turn causes a heavy deposit and then a light deposit on the surface being coated.

Additionally, in traditional two-way poppet valve assemblies, the required minimum size of the fluid capacitance chamber causes retention of excess fluid. After the poppet valve is closed, therefore, a substantial amount of fluid (termed after-drool) is deposited irregularly on the surface.

Such valve and associated switch assemblies, moreover, require a long stroke of the poppet valve piston with a subsequent long on/off cycle time which traditionally can be reduced only to about 40 milliseconds. The speed of the moving surface must thus be reduced below desired high speeds if limited portions of intermittent coatings on the surface are desired, resulting in relatively inefficient operation.

Finally, some fluid deposition systems, such as nozzle extruders of the type described in a 1982 bulletin entitled "Wide Band Extrusion Nozzles" of said Acumeter Laboratories, cause extreme shear along the longitudinal sides of the piston. Many adhesives and other fluids will not accept excessive shear, with the result that the extruder valve piston will not reciprocate.

The present invention, on the other hand, provides a novel three-way poppet valve assembly that unlike the above-described valves will permit precise, constant thickness patterns of fluid coating while causing only a minimum of after drool. Additionally, the present invention provides an apparatus with a piston having a short stroke to allow more rapid on/off cycle times, and of a design so as to reduce the created fluid shear at critical points, allowing the piston to reciprocate.

OBJECTS OF THE INVENTION

Accordingly, it is an object of the present invention to provide a new and improved poppet valve that, as before stated, shall not be subject to the above-described disadvantages and limitations but that, to the contrary, enables discrete, rapid uniform valving of fluid deposition on moving surfaces.

Another object is to provide such a novel method and apparatus that is adapted for intermittent directing of fluid flow upon a surface with minimum shear forces exerted on the fluid.

A further object is to provide for novel depositing of precise, constant thickness patterns of fluid on a moving surface, and preferably with constant velocity and pressure.

These and still further objects will become apparent hereinafter and are more fully delineated in the appended claims.

SUMMARY OF INVENTION

From one of its important viewpoints the invention embraces, in summary, a three-way poppet valve having a housing provided with a longitudinally extending internal chamber; a fluid supply port in the housing disposed to allow fluid to enter the chamber at a first region thereof; a fluid return port in the housing disposed to communicate with the chamber at a second region thereof and provided with a valve seat between the first and second regions; a fluid exit port disposed to allow fluid to exit from the chamber at a third region thereof and provided with a valve seat between the first and third regions; valving gate means disposed to reciprocate in said chamber between the valve seats; and means for switching the gate means alternately between said valve seats alternately to close off fluid flow to the return port and to direct fluid from the fluid supply port through the chamber to and through the exit port, and to close off the fluid flow through the exit port and to direct fluid from the fluid supply port through the chamber to and through the return port.

Preferred details and best mode embodiment features are hereinafter presented.

BRIEF DESCRIPTION OF THE DRAWING

The invention will now be described in connection with the appended drawing, the single FIGURE of which is a sectional view of a three-way poppet valve constructed in accordance with a preferred form of the invention.

DESCRIPTION OF THE PREFERRED EMBODIMENT

The label 1 in the drawing designates a three-way poppet valve assembly for directing the flow of a fluid and constructed in accordance with the invention. The poppet valve assembly has a housing assembly composed of a valve housing 2 connected to a front plate 3 and a bearing housing 4. The housing assembly is constructed to provide a longitudinally extending internal chamber 5.

Three ports or apertures extend through the housing assembly and connect to the internal chamber 5. A fluid supply port 6 enters generally transversely into a forward region of the chamber 5 and is used to supply fluid from a remote source S to the internal chamber in the direction of the dotted flow line indicated therein. A return port 7 at a region shown to the left of the port 6 conducts excess fluid from the internal chamber 5 to a remote location, which may be the remote source S of the fluid. The exit port 9, shown at the longitudinal end region of the housing, is used to supply fluid to a coating or deposition device, schematically illustrated as an extrusion nozzle N as of, for example, the types discussed in the said bulletins; enabling a predetermined quantity of fluid at constant pressure to be applied to a moving surface adjacent the nozzle opening, such as a roller R or web or other surface to be coated. While shown horizontally oriented, the assembly may also be vertically or otherwise disposed, as required.

Within the internal chamber 5 and securely attached to the front plate 3 is a forward seat 8 for a gate mechanism generally designated at 10, the rear seat 13 of which is securely attached to the valve housing 2 to the left of the supply port 6 within the internal cavity 5. The gate mechanism 10 is composed of a longitudinaly extending piston 11 having a tapered piston head 12, which in its forward position rests against the forward seat 8 to close off the exit of fluid through the exit port 9 to the nozzle N. In the forward position of the piston 11, the piston head 12 thus provides a fluid tight seal in abutting relation with the forward seat 8 so that fluid is prevented from passing through the exit port 9. When the piston 11 is it its rearward position, the rear surfaces of the piston head 12 abut the before-mentioned rear seat 13 providing a fluid-tight seal. This causes blockage of the flow of fluid within the internal chamber 5 to the return port 7 such that fluid exits the port 9 to the nozzle N.

As is apparent from the foregoing, valve seats 8 and 13 have circular cross-section flow bores, the diameter of the flow bore of valve seat 8 being substantially smaller than the diameter of the flow bore of valve seat 13. The valve seats are aligned longitudinally of the chamber 5, and the shaft of the piston 11 extends longitudinally in the chamber through the bore of the valve seat 13.

If a continuous supply of fluid is directed into the internal chamber 5, by the supply port 6, a quantity of fluid exits through either the return port 7 or the exit port 9 in order to retain balanced internal fluid pressure and a steady flow of fluid out of the internal chamber 5. The position of the gate mechanism 10 impedes fluid flow through either the exit port 9 or the return port 7 and therefore provides for a constant pressure flow of fluid through the other port so long as the continuous supply of fluid exists. This is by virtue of the configuration of the piston shaft, piston head, and valve seats, which is predetermined to maintain substantially constant flow area from the supply port 6 out of the chamber 5 through the bores of valve seats 8 and 13 regardless of the position of the piston head 12 relative to the valve seats.

The short longitudinal distance between the forward seat 8 and the rear seat 13 and the configuration of the piston head 12 cooperative therewith with its wide transverse dimension, enables the piston 11 to change the flow direction of the fluid with a short stroke and with rapidity. Where prior art devices of this type have been limited to relatively long on/off cycle times of about 40 milliseconds, as before stated, the present invention permits on/off (rearward piston position/forward piston position) cycle times of as low as 8 milliseconds or less when driven, for example, by an electro-pneumatic system 17, later described.

The V-shaped or conical front surface configuration of the poppet piston head 12 in the seating area of the forward seat 8 provides a minimum of fluid displacement upon the closing of the piston head 12 against the forward seat 8 when the piston 11 is moved into its forward (or right-hand) position. Only the tip portion of the conical front surface of the piston head 12 enters the bore of the valve seat 8. This obviates undesirable surges of fluid upon closing. The conical front surface of the piston head 12 contacts valve seat 8 along a line-contact circle the diameter of which has a magnitude that is a minor portion of the magnitude of the diameter of the base of the conical surface. The rear surface of the piston head 12 contacts the valve seat 13 along a line-contact circle the diameter of which is substantially larger than the diameter of the first-mentioned line-contact circle.

In addition, fluids, such as water-based emulsions, solvent-based coatings, coating rubber and toluene curable coatings, such as electron beam (EB) and ultraviolet (UV) curable type materials, and hot-melt thermoplastic materials, including adhesives, are easily processed through the three-way poppet valve assembly 1 of the invention. Many of these fluids and others will not accept excessive shear forces, as before intimated, and since prior valves, including the previously described two-way poppet valves, cause extreme shear along the longitudinally extending sides of the piston, problems in piston reciprocation have resulted. The three-way poppet valve of the invention, on the other hand, does not cause fluid shear at these critical points, since all fluid sealing is obtained by only line contact at the forward seat 8, rear seat 13 and a rearward fluid seal 15. The fluid seal 15 is shown as a gasket surrounding a rearward portion of the piston 11 to prevent fluid loss from the internal chamber 5 through the aperture in the bearing housing 4 through which the piston 11 extends. The piston is supported in the aperture by bearings 14 and 16 that allow unimpeded transverse movement of the piston 11 and longitudinal axial alignment of the piston 11 in the chamber 5.

The gate mechanism 10 may be activated by an air piston switching assembly 17 enclosed within an air manifold 18. The switching assembly 17 includes an air piston 19, mounted coaxially with the piston 11, with an air seal gasket 20 providing a seal between the air piston 19 and the air manifold 18. The air piston 19 is securely attached to the piston 11 of the gate mechanism 10 by a ring 22, such as a clamp ring or a threaded ring nut, and a rear nut 23. Longitudinal movement of the air piston 19 in the air manifold 18 thus causes proportional longitudinal movement of the piston 11 of the gate mechanism 10 of the three-way poppet valve assembly 1.

The air manifold 18 is provided with two apertures or air ports 21 and 24 located on opposite sides of the air piston 19 to provide a motive force for the reciprocation of the air piston 19. When compressed air is passed into the air port 21, the air piston 19 is forced in a longitudinal direction towards the forward seat 8, which longitudinally moves the piston 11, due to the attachment of the ring 22, towards the forward seat 8 (to the right) until the conical piston head 12 is in abutting and fluid sealing contact with the forward seat 8, stopping fluid flow through the exit port 9 as previously explained. In this position, a continuous supply of fluid passing into the internal chamber 5 through the supply port 6, passes around the piston head 12 and the rear seat 13 and out through the return port 7. Alternatively, when compressed air is passed into the air port 24, the air piston 19 is forced in a longitudinal direction away from the forward seat 8 (to the left), and the piston 11, due to the attachment of the nut 23, is also moved away from the forward seat 8 until the rearward tapered piston head 12 is in abutting and fluid sealing contact with the rear seat 13, stopping fluid flow through the return port 7. In this position, the continuous supply of fluid passing into the internal chamber 5 through the supply port 6, passes around the forward conical portion of the piston head 12 and the forward seat 8 and out through the exit port 9. In this manner, a continuous flow of fluid from the source S can be rapidly alternated for flow through the two ports 7 and 9 in discrete quantities, under constant pressure and with a minimum of shear forces being produced on the fluid.

If a nozzle N is connected to the exit port 9 of the three-way poppet valve assembly 1, as shown, to distribute fluid evenly over the width of a moving surface R, such as the before-mentioned rotating roller or a moving web or the like, the present invention provides for rapidly changing the on/off characteristics of the fluid flow upon such surface. This allows small discrete or periodic coatings to be obtained on a rapidly moving surface and from a constant fluid supply flow from the source S. Since the internal fluid pressure in the chamber 5 is kept constant, a uniform coating thickness is obtained over the entire coated portion of the moving surface. In view of the fact that the piston head 12 in conjunction with the forward seat 8 blocks the exit port 9 from the internal chamber 5, the only excess fluid that can remain in the nozzle N is that held in the exit port 9. Since that amount of fluid is small, a minimum of after-drool results on the moving surface R when the coating operation is ceased.

While the invention has been explained in connection with a preferred construction and mode of operation, it should be understood that modifications will occur to those skilled in this art that are considered to fall within the spirit and scope of the invention as defined in the appended claims.

What is claimed is:

1. In a fluid applicator system including a source of fluid and an applicator, a three-way poppet valve having a housing provided with a longitudinally extending internal chamber; a fluid supply port in the housing connected to said source to allow fluid to enter the chamber at a first region thereof; a fluid return port in the housing connected to said source to return fluid thereto, said fluid return port being disposed to communicate with the chamber at a second region thereof; a first valve seat between the first and second regions and having a circular cross-section flow bore; a fluid exit port connected to said applicator and disposed to allow fluid to exit from the chamber at a third region thereof and provided with a second valve seat between the first and third regions having a circular cross-section flow bore of diameter substantially smaller than the diameter of the flow bore of the first valve seat, said valve seats being aligned longitudinally of said chamber; valving gate means disposed to reciprocate in said chamber between the valve seats, said valving gate means comprising a piston having a shaft extending longitudinally in said chamber through the bore of said first valve seat with a piston head at one end of the shaft between said valve seats, said piston head having opposite tapered surfaces disposed to engage said valve seats alternately, the piston head surface engaging said second valve seat being a conical surface with a tip portion that enters the bore of said second valve seat, said conical surface contacting said second valve seat along a line-contact circle the diameter of which has a magnitude that is a minor portion of the magnitude of the diameter of the base of said conical surface, the piston head surface engaging said first valve seat contacting that valve seat along a line-contact circle the diameter of which is substantially larger than the diameter of the first-mentioned line-contact circle; and means connected to the opposite end of said shaft for switching the gate means alternately between said valve seats alternately to close off fluid flow to the return port and to direct fluid from the fluid supply port through the chamber to and through the exit port, and to close off the fluid flow through the exit port and to direct fluid from the fluid supply port through the chamber to and through the return port, the configuration of the piston shaft, piston head, and valve seats being predetermined to maintain substantially constant flow area from said supply port out of said chamber, thereby to maintain substantially constant pressure in said chamber regardless of the position of said piston head relative to said valve seats.

2. A three-way poppet valve as claimed in claim 1 and in which the said supply and return ports connect transversely with the said internal chamber at spaced longitudinal regions thereof, and the said exit port is disposed in longitudinal alignment with said chamber at an end region thereof.

3. A three-way poppet valve as claimed in claim 1 and in which the switching means comprises a reciprocating piston for driving the gate means.

4. A three-way poppet valve as claimed in claim 3 and in which the reciprocating piston is driven by a pressurized fluid.

5. A three-way poppet valve as claimed in claim 1 and in which said applicator deposits periodically exited fluid upon an adjacent moving surface.

6. A three-way poppet valve as claimed in claim 5 and in which said surface comprises roller means.

* * * * *